Figure 1:
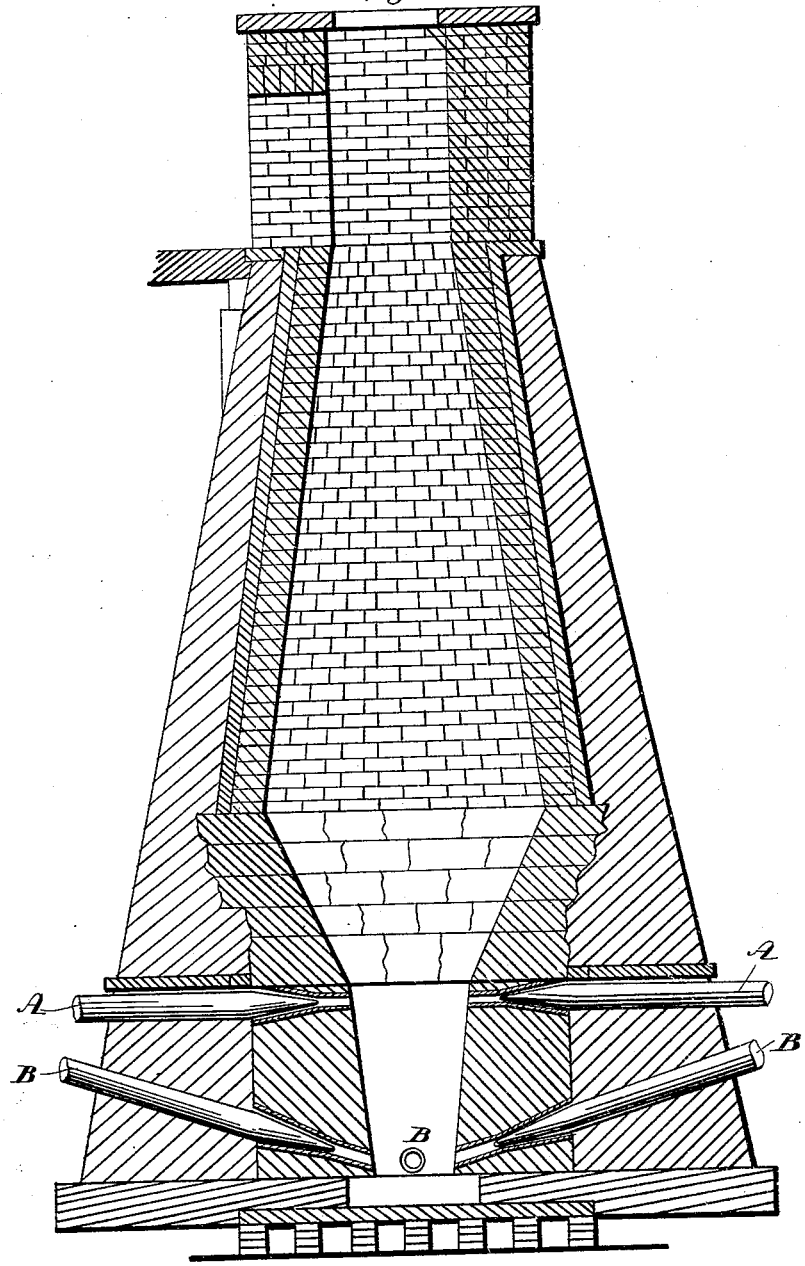

W. KELLY.
Blast Furnace.

No. 16,444.

Patented Jan. 20, 1857.

UNITED STATES PATENT OFFICE.

WILLIAM KELLY, OF EDDYVILLE, KENTUCKY.

IMPROVEMENT IN BLAST-FURNACES.

Specification forming part of Letters Patent No. 16,444, dated January 9, 1857.

*To all whom it may concern:*

Be it known that I, WILLIAM KELLY, of Eddyville, in the county of Lyon and State of Kentucky, have invented new and useful Improvements in Blast-Furnaces; and I do hereby declare that the following is a full and exact description thereof, reference being had to the accompanying drawings, and to the letters of reference marked thereon.

My invention consists in applying to the hearth of the blast-furnace an auxiliary tuyere or tuyeres, which I term "finery-tuyeres." Said tuyeres are only to be used—say, from ten to twenty-five minutes—previous to tapping the furnace, for the purpose of boiling and refining the iron contained in the hearth of the furnace.

Figure 1 represents a view of the hearth of a blast-furnace. A A are the smelting-tuyeres, supplied in the usual way with air from the blast-engine. B B B are a set of finery-tuyeres, introduced below the level of the smelting-tuyeres, and pointing down into the liquid mass in the hearth of the furnace, the muzzles of which finery-tuyeres should dip into or near the surface of the iron in the same manner and for the same purpose as the finery-fire.

I do not claim blowing blasts of air into a liquid mass of iron so as to refine it, as that is a well-known process; nor do I now claim in this process to refine the iron separate and apart from fuel, as the iron, when being so worked as above described in a blast-furnace, has a large body of fuel to cover it, in a manner substantially as in a finery-fire.

What I claim as my invention, and desire to secure by Letters Patent, is—

The combination of the hearth of a blast-furnace with the auxiliary tuyeres B B, &c., for delivering a blast of air into the fluid iron in said hearth, the whole constructed and operating in the manner and for the purpose specified.

WILLIAM KELLY.

Witnesses:
JNO. F. KELLY,
I. P. GRACEY.